United States Patent
Smith (10) Patent No.: US 8,866,870 B1
(45) Date of Patent: Oct. 21, 2014

(54) METHODS, APPARATUS, AND SYSTEMS FOR CONTROLLING FROM A FIRST LOCATION A LASER AT A SECOND LOCATION

(75) Inventor: David A. Smith, Cary, NC (US)

(73) Assignee: Lockheed Martin Corporation, Bethesda, MD (US)

( * ) Notice: Subject to any disclaimer, the term of this patent is extended or adjusted under 35 U.S.C. 154(b) by 440 days.

(21) Appl. No.: 13/277,786

(22) Filed: Oct. 20, 2011

(51) Int. Cl.
 *H04N 7/15* (2006.01)
 *G06F 17/00* (2006.01)
 *G05B 15/00* (2006.01)

(52) U.S. Cl.
 USPC ............... 348/14.05; 128/897; 235/462.01; 250/288; 345/204; 345/690; 348/211.8; 356/4.01; 356/153; 356/399; 358/475; 359/201.2; 359/202.1; 372/23; 385/116; 398/121; 600/112; 606/4

(58) Field of Classification Search
 CPC ... H04N 9/3129; H04N 1/047; H04N 1/1135; H04N 1/12; G02B 26/101
 USPC ............. 235/462.01; 250/288; 345/204, 690; 347/235, 259; 348/14.05, 211.8; 356/4.01, 399, 153; 358/475; 359/201.2, 202.1; 385/116; 398/121; 128/897; 372/23; 600/112; 606/4
 See application file for complete search history.

(56) References Cited

U.S. PATENT DOCUMENTS

| | | | | |
|---|---|---|---|---|
| 3,876,309 A * | 4/1975 | Zicaro et al. | .................. | 356/153 |
| 5,546,492 A * | 8/1996 | Ansley et al. | ................. | 385/116 |
| 5,719,622 A * | 2/1998 | Conway | ..................... | 348/211.8 |
| 5,871,017 A * | 2/1999 | Mayer | ........................... | 128/897 |
| 5,959,606 A * | 9/1999 | Goodman et al. | ............ | 345/690 |
| 5,989,182 A * | 11/1999 | Hori et al. | ..................... | 600/112 |
| 6,422,466 B1* | 7/2002 | Dickson et al. | .......... | 235/462.01 |
| 6,707,039 B1* | 3/2004 | Truche et al. | ................ | 250/288 |
| 7,460,146 B2* | 12/2008 | Towner | ........................ | 347/259 |
| 7,675,509 B2* | 3/2010 | Champion et al. | ........... | 345/204 |
| 7,719,738 B2* | 5/2010 | Abu-Ageel | ................. | 359/201.2 |
| 8,139,203 B2* | 3/2012 | Lepere et al. | ................ | 356/4.01 |
| 8,169,454 B1* | 5/2012 | Hajjar et al. | .................. | 347/235 |
| 8,379,204 B1* | 2/2013 | Cordingley et al. | .......... | 356/399 |
| 2002/0154364 A1* | 10/2002 | Green et al. | ................... | 359/172 |
| 2008/0234666 A1* | 9/2008 | Yadlowsky et al. | .............. | 606/4 |
| 2009/0116518 A1* | 5/2009 | Patel et al. | ...................... | 372/23 |
| 2011/0249312 A1* | 10/2011 | Ishida et al. | ............... | 359/202.1 |
| 2013/0188229 A1* | 7/2013 | Paul et al. | ..................... | 358/475 |

* cited by examiner

*Primary Examiner* — Gerald Gauthier
(74) *Attorney, Agent, or Firm* — Withrow & Terranova, PLLC (57) ABSTRACT

A method, apparatus, and system for controlling from a first location a laser at a second location are disclosed. Laser orientation data is determined at a first location. The laser orientation data is communicated to the second location. Video data is received from the second location that includes imagery of a laser beam emitted by a laser, and the imagery is presented on a display at the first location.

20 Claims, 8 Drawing Sheets

METHODS, APPARATUS, AND SYSTEMS FOR CONTROLLING FROM A FIRST LOCATION A LASER AT A SECOND LOCATION

FIELD OF THE DISCLOSURE

The subject matter of the present disclosure relates generally to communications between users in different locations, and in particular to controlling from a first location a laser at a second location, in order to enable one user to easily identify an object, or a feature of an object, that is in the presence of the other user.

BACKGROUND

Telephone calls can result in misunderstandings simply because of the absence of the visual cues that accompany in-person, or face-to-face, communications. Dry humor or sarcasm, for example, may be misconstrued as ignorance. Video conferencing, where the participants in a conversation can view each other's faces while they are talking, can reduce these problems, and can create a communication exchange that closely approximates in-person communications. However, certain types of communications, such as those where participants are discussing an object that is in the presence of one of the participants, are still better conducted in-person than via a video conference because it can be difficult for the participant who is remote from the object to convey to the other participant exactly what part of the object the remote participant is referring to. While the participant who is in the presence of the object may simply, for example, touch the part of the object that is relevant to that participant's comments, and this action may then be seen via video conference by the other (remote) participant, it may be impossible for the remote participant to similarly convey exactly what portion of the object that participant desires to discuss. Accordingly, there is a need for a mechanism by which a participant at one location can easily identify to a participant in a second location a particular aspect or feature of an object that is in the presence of the participant in the second location.

SUMMARY

The present disclosure relates to methods, apparatus, and systems by which an individual at a first location can control a laser at a second location. In one embodiment, first and second users, located at first and second locations, respectively, such as two rooms that are geographically distant from one another, are engaged in a collaboration. A laser controller controls a laser at the second location. A camera at the second location provides video data that includes imagery of at least a portion of the second location, including imagery of a laser beam emitted by the laser, to the first location for display to the first user. The first user performs a laser orientation action that identifies a desired change in a direction of the laser beam. A computing device at the first location determines laser orientation data based on the laser orientation action. The laser orientation data is communicated from the first location to the second location. The laser controller at the second location controls the laser based on the laser orientation data. The camera continuously generates and provides video data that includes imagery of the portion of the second location, including imagery of the laser beam, to the first location, where the video data is presented on a display for the first user. The first user can therefore observe the manner in which the laser orientation action affects the laser at the second location substantially in real time.

In one embodiment, the laser orientation action is a movement of the first user's hand from a first location in space to a second location in space. A motion detection function, coupled to or integrated with the computing device, detects the movement of the hand from the first location in space to the second location in space, and determines the laser orientation data based at least in part on the first location in space and the second location in space.

In another embodiment, a device is coupled to the first user's hand, and as the first user moves her hand from the first location in space to the second location in space, the device communicates first location data identifying the first location in space and second location data identifying the second location in space. In one embodiment, the device is held, or otherwise grasped, by the first user. In another embodiment, the device is worn on a digit of the first user.

In another embodiment, the laser orientation action comprises a manipulation of a device that comprises an input receptor, such as a touch-sensitive surface. For example, the first user may slide a digit across the touch-sensitive surface. Responsive to such movement, the device communicates location data, such as x, y coordinates, to the computing device, thereby identifying the movement with respect to a Cartesian coordinate system associated with the touch-sensitive surface. The computing device then generates the laser orientation data based on the location data.

In one embodiment, the computing device sends laser orientation data that comprises a sequence of location information that defines a relatively continuous path. The laser controller comprises a laser scanner that is configured to control the laser in a scanning mode to generate a persistent laser beam image along a relatively continuous laser beam path in accordance with the location information.

In one embodiment, the first user is in a first location that comprises a first room having four walls, and the display substantially completely encompasses one of the four walls, such that the display extends from a ceiling of the first room to a floor of the first room vertically, and from a first side wall to a second side wall horizontally. The video data received from the second location is depicted on the display such that objects depicted in the imagery are depicted on the display at life size. The second user is in a second location that comprises a second room, and consequently the imagery presented to the first user comprises imagery of four walls, a ceiling, and a floor of the second room, such that it appears to the first user that the imagery depicted on the display extends from the first room into the second room.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to controlling from a first location a laser at a second location, in order to enable a user at the first location to easily and intuitively use the laser to facilitate a collaboration with a second user at the second location. Embodiments are presented herein to facilitate an understanding of the disclosure, but the principles of the disclosure and the scope of the claims are not limited to such embodiments.

Figure 1:
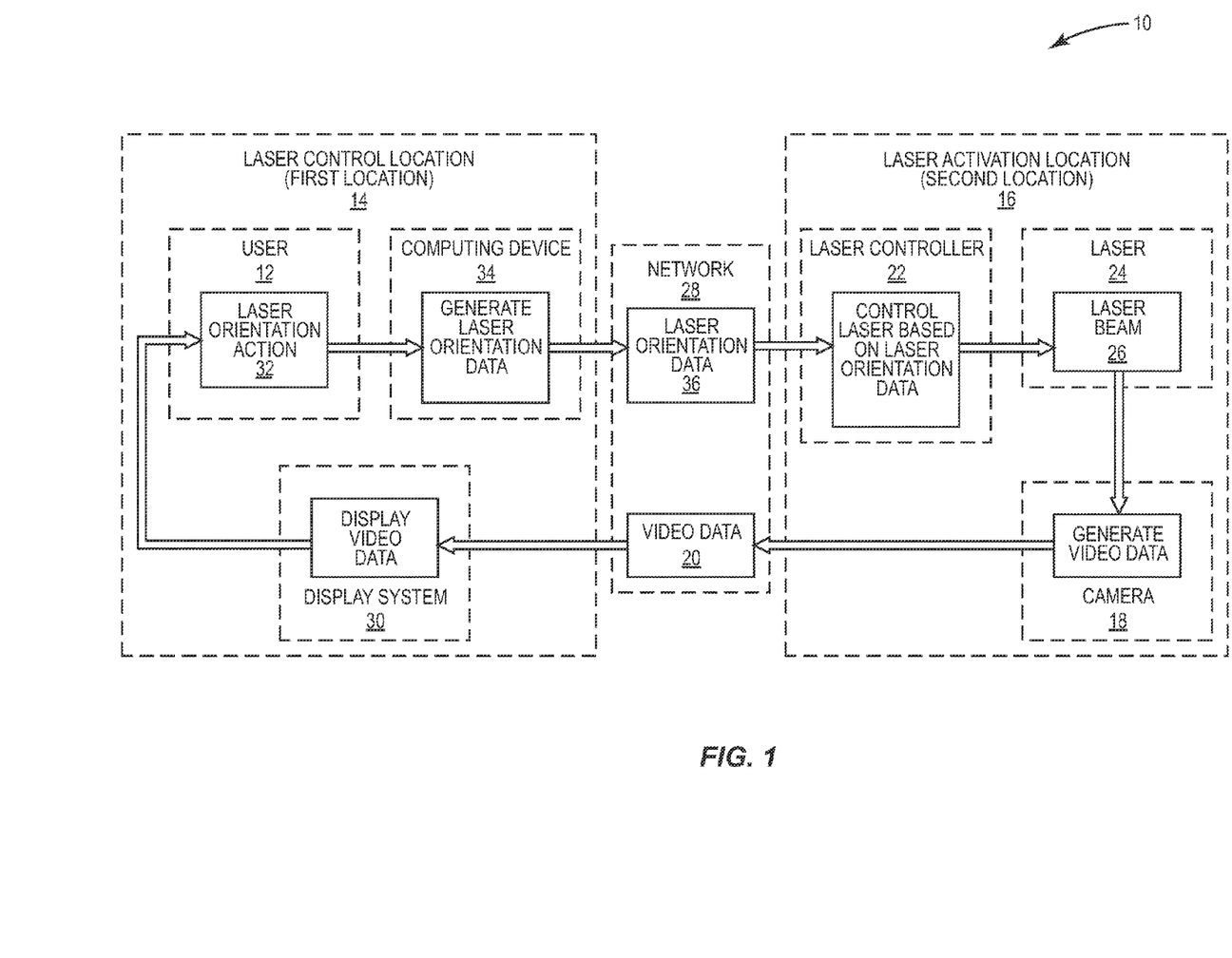
FIG. 1 is a block diagram that illustrates an exemplary system in which embodiments of the present disclosure may be practiced, as well as exemplary functionality associated with various entities of the system according to one embodiment.

FIG. 1 is a block diagram that illustrates an exemplary system 10 in which embodiments of the present disclosure may be practiced, as well as exemplary functionality associated with various entities of the system according to one embodiment. A user 12 in a laser control location 14 is collaborating with another user (not illustrated) in a laser activation location 16. The collaboration preferably includes at least a one-way video conference wherein the laser activation location 16 includes a camera 18 that during the collaboration substantially continuously generates video data 20 that includes imagery of at least a portion of the laser activation location 16. The laser control location 14 is preferably a room that includes four walls, a floor, and a ceiling, and may be referred to herein as the "first location." The laser activation location 16 is also preferably a room that includes four walls, a floor, and a ceiling, and may be referred to herein as the "second location." The laser activation location 16 may include an object of interest that is the focus of the collaboration between the users. The video data may comprise any data used to convey continuous sequences of imagery captured by a video camera, and may be in a compressed format, such as an MPEG-4 format or other suitable format.

The laser activation location 16 also includes a laser controller 22 that controls a laser 24 in the laser activation location 16. Responsive to the laser controller 22, the laser 24 emits a laser beam 26. The laser beam 26 is captured by the camera 18 and is depicted in the imagery of the video data 20 generated by the camera 18. The video data 20 is communicated to the laser control location 14 via a network 28. A display system 30 in the laser control location 14 displays the video data 20 on a display (not illustrated) for presentation to the user 12. The user 12 observes the imagery that includes the portion of the laser activation location 16, including the imagery of the laser beam 26, and performs a laser orientation action 32 that identifies a desired change in a direction of the laser beam 26. The laser orientation action 32, as discussed in greater detail below with reference to FIG. 2, may comprise, for example, a movement of a body part, such as a hand of the user 12, from a first location in the space of the laser control location 14 to a second location in the space of the laser control location 14. In another embodiment, the user 12 may carry, or wear on a digit of the hand, a device that identifies the laser orientation action 32 by generating data, such as x, y coordinates, or x, y, and z coordinates, that identify a movement of the hand of the user 12 from the first location to the second location within a plane or volume defined by a Cartesian coordinate system.

A computing device 34 in the laser control location 14 determines laser orientation data 36 based on the laser orientation action 32. For example, the laser orientation data 36 may identify the first location of the hand, the second location of the hand, and a velocity of the movement of the hand from the first location to the second location. The laser orientation data 36 is communicated via the network 28 to the laser activation location 16. The laser controller 22 receives the laser orientation data 36, and controls the laser 24 based on the laser orientation data 36 to move the laser beam 26. In particular, the laser controller 22 controls the laser 24 to move the laser beam 26 substantially in accordance with the laser orientation action 32. The user 12 observes real-time imagery contained in the video data 20 on the display, and thus receives real-time feedback identifying how the laser orientation action 32 alters the laser beam 26. The computing device 34 may also be referred to herein as a "laser control apparatus."

Figure 2:
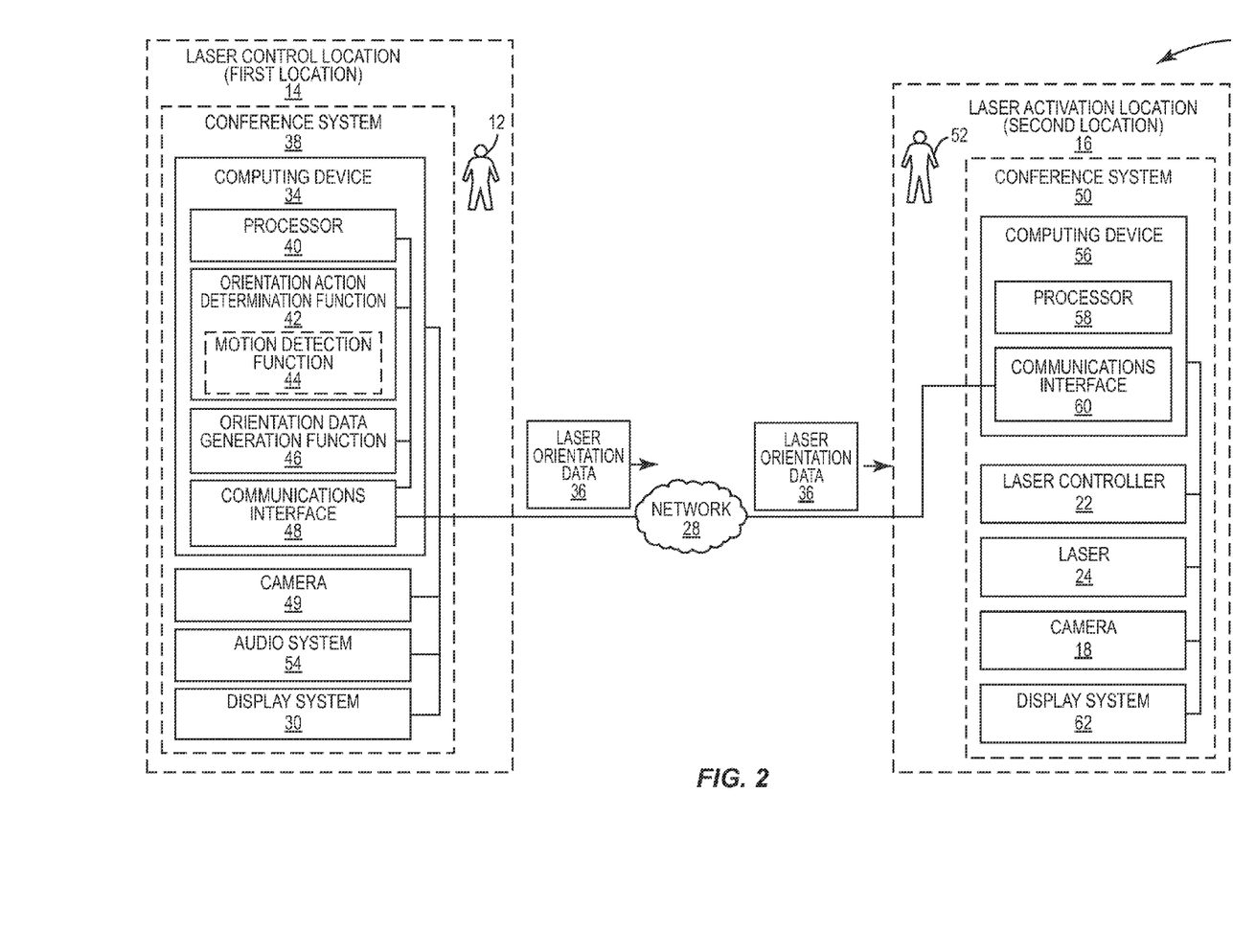
FIG. 2 is a block diagram illustrating exemplary computing systems in the context of the system illustrated in FIG. 1 that are suitable for implementing embodiments of the present disclosure.

FIG. 2 is a block diagram illustrating exemplary conference systems in the context of the system 10 suitable for implementing embodiments of the present disclosure. A first conference system 38 includes the computing device 34, which includes a processor 40 that, among other features, is suitable for executing programming instructions to implement and/or control some or all of the functionality described herein with respect to the conference system 38. The computing device 34 also includes an orientation action determination function 42 that is configured to determine a laser orientation action 32 performed by the user 12. The orientation action determination function 42 may be implemented via software instructions that execute on the processor 40, may be implemented in firmware or other circuitry, or may comprise a combination of software instructions and circuitry. In one embodiment, the orientation action determination function 42 includes a motion detection function 44 that is configured to detect motions of the user 12. In particular, the motion detection function 44 may include a camera (not illustrated) and suitable image analysis processing capabilities to detect a movement of the user 12, such as a movement of a hand of the user 12 from a first location in the space of the laser control location 14 to a second location in the space of the laser control location 14.

The computing device 34 may also include an orientation data generation function 46 that is configured to generate laser orientation data 36 based on a laser orientation action 32 (FIG. 1) of the user 12. The orientation data generation function 46 may be implemented via software instructions that execute on the processor 40, may be implemented in firmware or other circuitry, or may comprise a combination of software instructions and circuitry. The computing device 34 also includes a communications interface 48 that is configured to communicate with the network 28.

The conference system 38 may include a camera 49 that generates video data comprising imagery that depicts at least portions of the laser control location 14, as well as the user 12. The video data may be communicated via the network 28 to a second conference system 50 for presentation to a user 52. The conference system 38 also includes the display system 30. The display system 30 may comprise, for example, a two-dimensional (2D) or three-dimensional (3D) high definition (HD) or standard definition (SD) projector which displays an image on a display screen, or may comprise a monitor, such as a liquid crystal display (LCD) or plasma monitor. The conference system 38 may also include an audio system 54, such as a sound card and speakers, for presenting audio data received from the conference system 50.

While for purposes of illustration FIG. 2 shows the computing device 34 separate from but communicatively coupled to certain components, such as the camera 49, the display system 30 and the audio system 54, in other embodiments one or more of such components may be integrated with the computing device 34.

The conference system 50 in the laser activation location 16 similarly includes a computing device 56 that includes a processor 58. The processor 58, among other features, is suitable for executing programming instructions to implement and/or control some or all of the functionality described herein with respect to the conference system 50. The computing device 56 also includes a communications interface 60 that is configured to communicate with the network 28. The conference system 50 also includes the laser controller 22 that is adapted to control the laser 24. In one embodiment, the laser controller 22 comprises a laser scanner that operates to receive the laser orientation data 36 (FIG. 1) and control the laser 24 in a scanning mode to generate a persistent laser beam image along a relatively continuous laser beam path. The conference system 50 also includes the camera 18, which, during the collaboration between the users 12 and 52, substantially continuously generates video data 20 (FIG. 1) that includes imagery of at least a portion of the laser activation location 16. The conference system 50 may also include a display system 62 for presenting video data received from the laser control location 14 to the user 52, thereby facilitating a two-way video conference call. While for purposes of illustration FIG. 2 shows the computing device 56 separate from but communicatively coupled to certain components, such as the laser controller 22, the laser 24, the display system 62, and the camera 18, in other embodiments one or more of such components may be integrated with the computing device 56.

Figure 3:
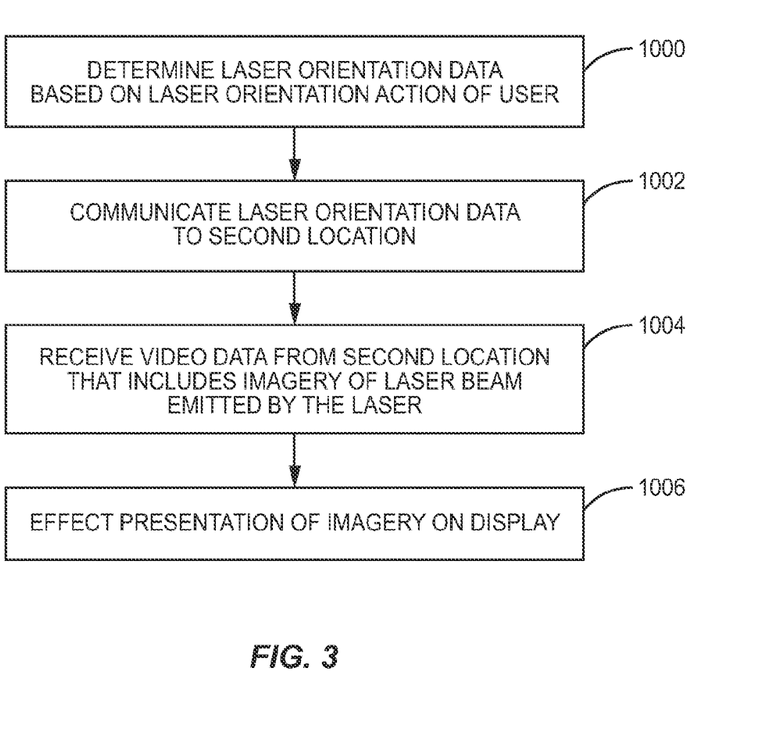
FIG. 3 is a flowchart illustrating an exemplary process for implementing embodiments of the present disclosure in the context of the computing systems illustrated in FIG. 2.

FIG. 3 is a flowchart illustrating an exemplary process for controlling from a first location a laser in a second location in the context of the conference systems 38, 50 illustrated in FIG. 2. FIG. 3 will be discussed in conjunction with FIG. 2. Assume that the user 12 and the user 52 desire to collaborate with one another, and therefore initiate a two-way video conference. The conference systems 38, 50 enable the users 12, 52 to hear one another and to view both one another and portions of the locations in which the users 12, 52 are located. In particular, assume that the laser control location 14 is a room, and that the camera 49 is mounted on or near a front wall of the laser control location 14. The camera 49 is pointed toward a back wall of the laser control location 14, and thus generates video data that includes imagery of the user 12 and a substantial portion of the laser control location 14. Such video data is communicated to the laser activation location 16 via the network 28 for presentation to the user 52 via the display system 62.

Similarly, assume that the laser activation location 16 is another room, and that the camera 18 is mounted on or near a front wall of the laser activation location 16. The camera 18 is pointed toward a back wall of the laser activation location 16, and thus generates video data that includes imagery of the user 52 and a substantial portion of the laser activation location 16. Such video data is communicated to the laser control location 14 via the network 28 for presentation to the user 12 via the display system 30.

Assume further that a topic of the collaboration is an object, such as an engine, that is present in the laser activation location 16. The user 12 desires to discuss a particular feature of the engine, and requests that the user 52 turn on the laser 24. The laser 24 is preferably mounted at a location in the laser activation location 16 that allows the laser beam 26 (FIG. 1) to be directed toward an object located in the laser activation location 16. For example, the laser 24 may be mounted at or near the top of the front wall of the laser activation location 16, or may be mounted in the center of the ceiling of the laser activation location 16. By default, when initially turned on, the laser controller 22 may direct the laser 24 at a default location in the laser activation location 16, such as the middle of the laser activation location 16. Alternately, for eye safety, a default location may be a location where it is unlikely the laser beam 26 could make contact with a human, such as the upper portion of a back wall of the laser activation location 16.

In an alternate embodiment, the user 12 may be able to control, in addition to the orientation of the laser 24, other functionality of the laser 24, such as on/off functionality. In particular, the user 12 may perform a laser control action that is recognized by the computing device 34 as corresponding to a particular laser control command. For example, the user 12 may hold her right hand in the air and rapidly move the hand to the right and back to the left. Such laser control action may be detected by the motion detection function 44, and recognized by the computing device 34 as corresponding to a "Laser On" laser control command. In response, the computing device 34 generates a "Laser On" laser control command and communicates the laser control command to the conference system 50 via the network 28. Upon receipt of the laser control command, the laser controller 22 turns on the laser 24.

As the laser 24 is turned on, the laser 24 emits the laser beam 26. During the collaboration, the camera 18 continuously generates video data that includes imagery of the laser activation location 16, including imagery of the laser beam 26. The video data is communicated to the conference system 38 and presented to the user 12 via the display system 30. Thus, the user 12 receives nearly instantaneous real-time feedback of the results of her laser orientation action 32. The user 12 can immediately determine where the laser beam 26 is directed in the laser activation location 16, and may perform a laser orientation action 32 to communicate a desired change in the direction of the laser beam 26 such that the laser beam 26 is directed to the particular feature of the engine that the user 12 desires to discuss with the user 52. The laser orientation action 32 may be, for example, a movement of a body part of the user 12, such as a hand, from a first location in the space of the laser control location 14 to a second location in the space of the laser control location 14.

The movement preferably tracks the desired change in the direction of the laser beam 26. For example, assume that when initially turned on, the default direction of the laser 24 was such that the laser beam 26 was directed at a location in the center of the floor of the laser activation location 16, and that the particular feature of the engine was, from the perspective of the user 12, to the right of such location. The user 12 may move her hand horizontally to the right. The motion detection function 44 detects the laser orientation action 32, i.e., detects the movement of the hand of the user 12 horizontally to the right. The orientation data generation function 46 determines the laser orientation data 36 based on the laser orientation action 32 (FIG. 3, step 1000). In particular, the laser orientation data 36 may comprise data that identifies attributes of the movement of the hand of the user 12, such as identifying the first location in space with respect to a reference Cartesian coordinate system that corresponds to the laser control location 14, and a velocity of the movement of the hand. The laser orientation data 36 may be in any form that provides sufficient information to the conference system 50 to enable the conference system 50 to control the laser 24 in substantial synchronicity with the laser orientation action 32, such that the laser orientation action 32 results in a movement of the laser beam 26 that is related to the laser orientation action 32.

The computing device 34 may continuously communicate the laser orientation data 36 to the conference system 50 over a period of time at a predetermined, or preconfigured, granularity. For example, as the user 12 moves her hand horizontally a distance of 18 inches, the computing device 34 may continuously determine and generate laser orientation data 36 that identifies each ¼-inch incremental movement of the hand. It will be appreciated that any desired level of granularity within the capability of the orientation action determination function 42 may be selected.

As the orientation data generation function 46 determines the laser orientation data 36, the laser orientation data 36 is communicated to the conference system 50 (FIG. 3, step 1002). The conference system 50, via the laser controller 22, interprets the laser orientation data 36 and alters the orientation of the laser 24 to direct the laser beam 26 in accordance with the laser orientation data 36. For example, upon receipt of the laser orientation data 36 indicating a movement of the hand of the user 12 horizontally 18 inches, the laser controller 22 may move the laser beam 26 to the right 18 inches. Alternately, the laser controller 22 may scale the movements in accordance with a predetermined or preconfigured scale to allow finer movements of the laser 24. For example, an 18-inch movement of the hand of the user 12 may result in a 6-inch movement of the laser beam 26. The particular scale may be controlled by the user 12 via laser control actions that allow the user 12 to alter the scale as desired to facilitate rapid and accurate control of the laser beam 26.

The camera 18 generates video data 20 that includes imagery of at least a portion of the laser activation location 16 and the laser beam 26, and communicates the video data 20 to the conference system 38. The conference system 38 receives the video data 20, and effects presentation of the imagery to the user 12 via the display system 30 (FIG. 3, steps 1004-1006). In this manner, the user 12 intuitively controls the laser 24 from the laser control location 14 to facilitate the collaboration.

In another embodiment, the orientation action determination function 42 may determine the laser orientation action 32 in conjunction with a device that is coupled to the user 12, rather than via the motion detection function 44. For example, the user 12 may hold, or otherwise grasp, a device that is capable of transmitting data, either wired or wirelessly via radio frequency, for example, that identifies movements of the device. Such device may comprise, for example, one or more of an accelerometer and a six-degree-of-freedom gyroscope. As the user 12 moves the device about the laser control location 14, the device continuously transmits data identifying attributes of the movement of the device, such as an orientation of the device, movements from one location in space to another, velocity of the movement, and the like. Based on such data, the orientation data generation function 46 generates the laser orientation data 36, which is communicated to the conference system 50 for use by the laser controller 22 as discussed above.

In another embodiment, the device may include input receptors, such as buttons, a touch-sensitive surface, or the like, the manipulation of which may identify certain laser control actions or laser orientation actions 32 of the user 12. For example, the user 12 may depress a first button on the device to indicate a desire to turn on the laser 24. In particular, upon depression of the first button, the input device may communicate data to the computing device 34 via radio frequency (RF) signals. The computing device 34 determines that the data corresponds to a Laser On laser control command, generates a Laser On laser control command, and sends the laser control command to the conference system 50. Upon receipt thereof, the laser controller 22 turns on the laser 24. Depression of a second button by the user 12 may, in a similar manner, cause the laser controller 22 to turn off the laser 24.

Figure 4:
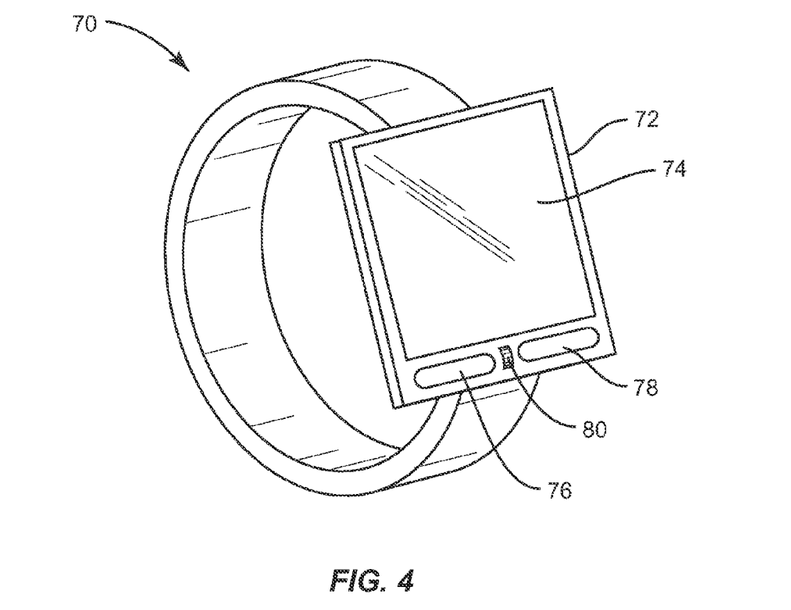
FIG. 4 is a perspective view of an input device suitable for identifying laser orientation actions according to one embodiment.

In one embodiment, such device may comprise an input device such as that described in co-pending U.S. patent application Ser. No. 13/111,476, entitled "INPUT DEVICE CONFIGURED TO CONTROL A COMPUTING DEVICE," the contents of which are hereby incorporated herein by reference in its entirety. FIG. 4 is a perspective view of an input device 70 suitable for identifying laser control actions and laser orientation actions 32 according to one embodiment. The input device 70 includes a platform 72 that comprises various input receptors, including a touch-sensitive surface 74, two selectable buttons 76, 78, and a wheel 80. Manipulation of the selectable buttons 76, 78 and/or the wheel 80 by the user 12 causes the generation of receptor data that identifies the respective manipulation. The input device 70 determines event data based on the receptor data, and transmits the event data to the computing device 34. The event data identifies laser control actions or laser orientation actions 32 performed by the user 12, such as the movement of the hand of the user 12, movement of a digit across the touch-sensitive surface 74, the depression of one of the buttons 76, 78, the rotation of the wheel 80, or the like. As discussed above, each laser orientation action 32 may result in the communication of laser orientation data 36 to the conference system 50, and a corresponding manipulation of the laser beam 26 by the laser controller 22.

Each input receptor may generate different receptor data depending on the particular manipulation of the respective input receptor. Such receptor data is processed by a processor (not shown in FIG. 4) of the input device 70 to determine event data corresponding to the receptor data. The event data may be the same as the receptor data generated by the input receptor, or may be data that is based on the receptor data. For example, if a touch of the touch-sensitive surface 74 results in the generation of binary receptor data such as 0x10FA, the processor may determine that the event data corresponding to the receptor data comprises 0x10FA. Alternately, the processor may access a table that contains translation information that translates the receptor data into different event data. For example, the table may indicate that the receptor data 0x10FA translates into event data having a value of 0x1213. Ultimately, the determined event data is transmitted by the input device 70 to the computing device 34, which interprets the event data as a laser control command or a laser orientation action 32 of the user 12.

Different manipulations of input receptors generally result in the determination by the input device 70 of different event data. Thus, sliding a digit across the touch-sensitive surface 74 may generate particular event data that identifies a starting location on the touch-sensitive surface 74, an ending location on the touch-sensitive surface 74, and a velocity of the movement of the digit. Tapping the touch-sensitive surface 74 may generate different event data. Event data may also identify positional data, magnitude data, speed data, force data, and the like. The input device 70 may generate and send event data consecutively based on a sampling rate, such as 100 times per second. Thus, based on a motion sensor input receptor, for example, during the course of a fluid movement of a user's hand from a first location in space to a second location in space, the input device 70 may continually determine and transmit event data identifying the position of the hand, or the relative position of the hand at each location of the hand at 0.01 second increments. Similarly, as a digit is moved across the touch-sensitive surface 74, the input device 70 may continually determine and transmit event data identifying x, y coordinates that correspond to the position of the digit on the touch-sensitive surface 74 with respect to a Cartesian coordinate system associated with the touch-sensitive surface 74. Thus, event data may be a relatively discrete unit of data, such as that associated with the selection of a selectable button 76, 78, or may be a consecutive series of data.

Figure 5:
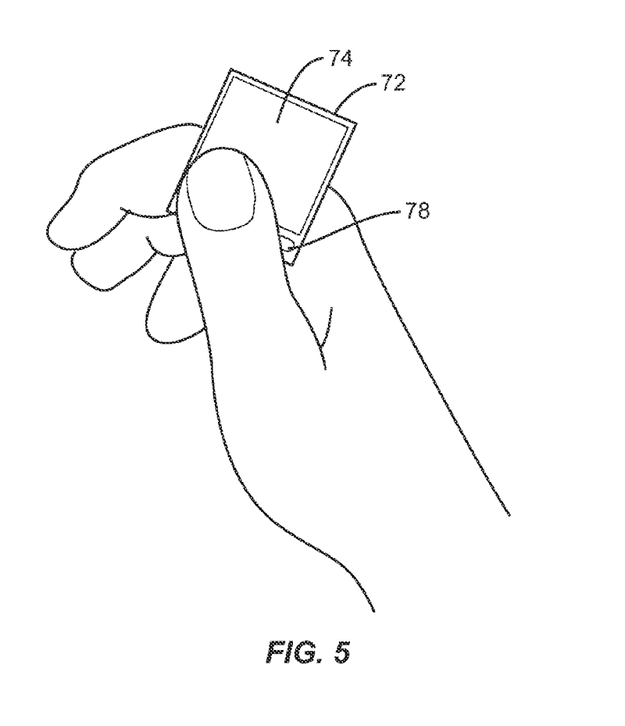
FIG. 5 illustrates the input device illustrated in FIG. 3 in operation, according to one embodiment.

FIG. 5 illustrates the input device 70 in operation, according to one embodiment. The input device 70 may be worn on a digit, such as an index finger of the user 12. A second digit, such as a thumb, may manipulate one or more input receptors carried on the platform 72, such as the touch-sensitive surface 74, selectable buttons 76, 78, or wheel 80 (FIG. 4), to cause the generation of receptor data and determination of event data by the input device 70 for transmission to the computing device 34.

Figure 6:
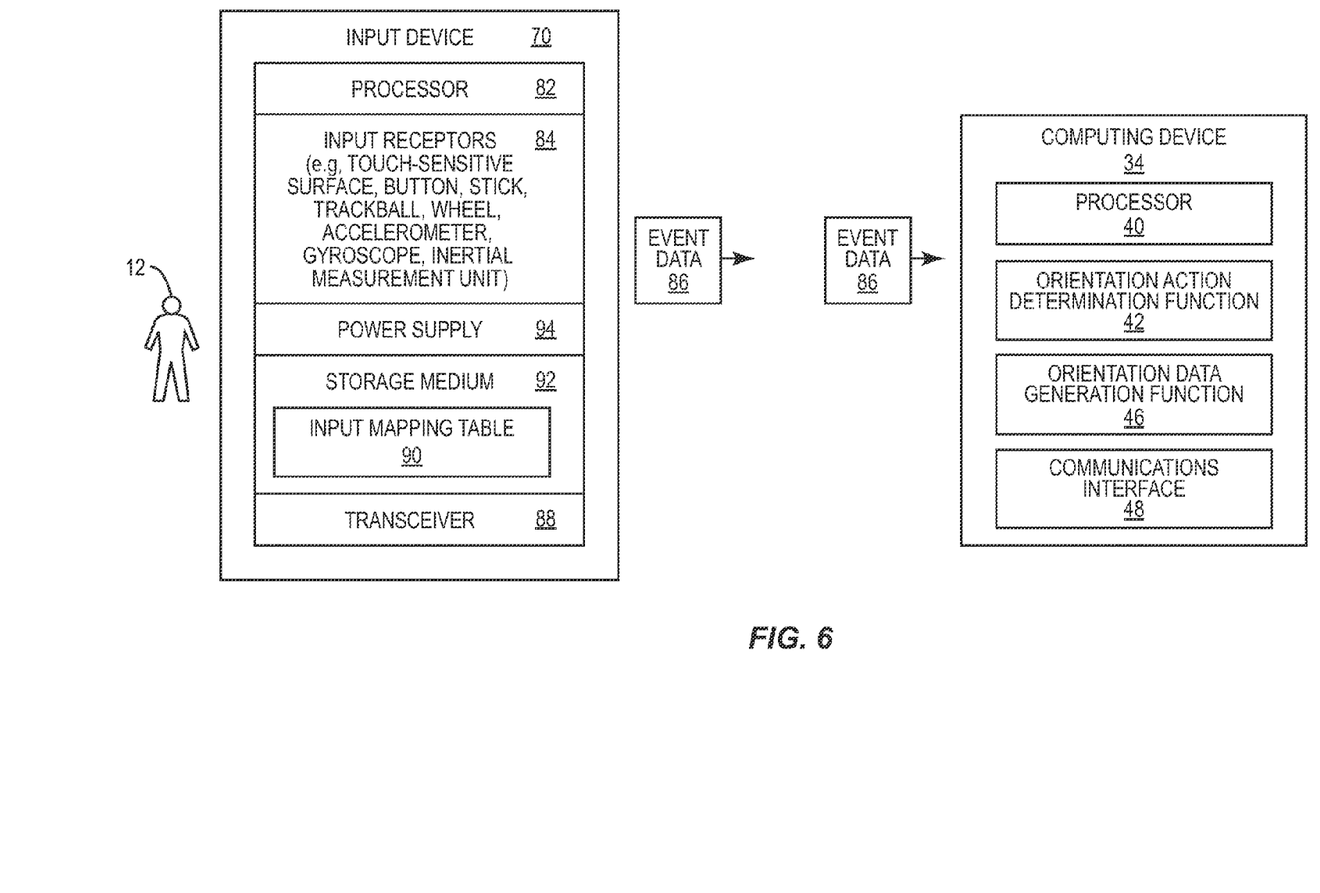
FIG. 6 is a block diagram illustrating data flow from the input device to a computing device according to one embodiment.

FIG. 6 is a block diagram illustrating data flow from the input device 70 to the computing device 34 according to one embodiment. The input device 70 may include a processor 82 that is capable of receiving signals from one or more input receptors 84, such as the touch-sensitive surface 74, the selectable buttons 76, 78, the wheel 80, or the like. One type of input receptor 84 may be referred to generally as a motion sensor, and may comprise any suitable mechanism for detecting motion of the digit on which the input device 70 is worn from a first location in space to a second location in space. The motion sensor may comprise, for example, an accelerometer; a tilt sensor; a six-degree-of-freedom gyroscope; a gravimeter; a combination of such technologies, such as an inertial measurement unit (IMU); or the like. An angular rate sensor may be used in conjunction with an accelerometer to determine an orientation angle of the input device 70.

Generally, upon detection of motion of the input device 70 from a first location in space to a second location in space, such as may occur when the user 12 moves her hand from one position to another, the motion sensor generates receptor data identifying such motion. The processor 82 receives the receptor data and determines event data 86 associated with the receptor data. The processor 82 then generates a control signal comprising the event data 86 via a transceiver 88, and sends the control signal to the computing device 34. The transceiver 88 may be an integral RF transmitter and RF receiver, or may comprise a separate RF transmitter and RF receiver.

The event data 86 may travel through a wireless network (not shown), or may be sent directly to the computing device 34. The transceiver 88 can also allow the input device 70 to receive data from the computing device 34 that can be utilized by, for example, output components to provide feedback to the user 12. The transceiver 88 can conform to any one or more of a variety of protocols, such as one of the 802.11 family of protocols (e.g., Wi-Fi®, WiMAX, etc.), Bluetooth®, wireless Universal Serial Bus (USB), or the like. In embodiments wherein the input device 70 does not process data received from the computing device 34, an RF transmitter may be used in lieu of the transceiver 88.

In one embodiment, the processor 82 may access an input mapping table 90 stored in a storage medium 92 to translate the receptor data generated by the input receptor 84 into the event data 86. Such translation may comprise any desired translation of information from one format or value to another format or value.

As discussed previously, the input receptors 84 may also comprise components that detect manipulations by a digit, such as the touch-sensitive surface 74, selectable buttons 76, 78, a trackball, or the like. Manipulation of an input receptor 84 by the user 12 causes the input receptor 84 to generate receptor data identifying the manipulation. For example, if the input receptor 84 is a touch-sensitive surface 74, upon detection of a touch of the input receptor 84 by the digit, the input receptor 84 may generate receptor data identifying a location of the touch with respect to a reference point of the touch-sensitive surface 74, such as a lower left corner of the touch-sensitive surface 74; a pressure of the touch; a movement of the touch; or the like. The processor 82 receives the receptor data and determines event data 86 for transmission to the computing device 34. As discussed previously, the event data 86 may be the same as the receptor data, or the receptor data may be translated into event data 86 that differs from the receptor data based on the input mapping table 90.

In one embodiment, concurrent detection of movement by a first input receptor 84, such as an IMU, and of a manipulation of a second input receptor 84, such as the touch-sensitive surface 74, may result in event data 86 that is different from the event data 86 that would otherwise be generated in response to solely the detection of movement by the first input receptor 84, or of the manipulation of the second input receptor 84.

The input device 70 also preferably includes a power supply 94. Examples of suitable power supplies 94 include, but are not limited to, a battery, a USB port and charging cable, an AC/DC port and charging cable, a solar cell, a combination of such technologies, and the like.

The computing device 34 receives the event data 86 that identifies one or more laser control commands or laser orientation actions 32. The orientation action determination function 42 may translate or otherwise map event data 86 identifying laser orientation actions 32 into a format suitable for the orientation data generation function 46 that identifies particular laser orientation action(s) 32 to which the event data 86 corresponds, or may simply pass such event data 86 to the orientation data generation function 46 for generation of laser orientation data 36.

Figure 7:
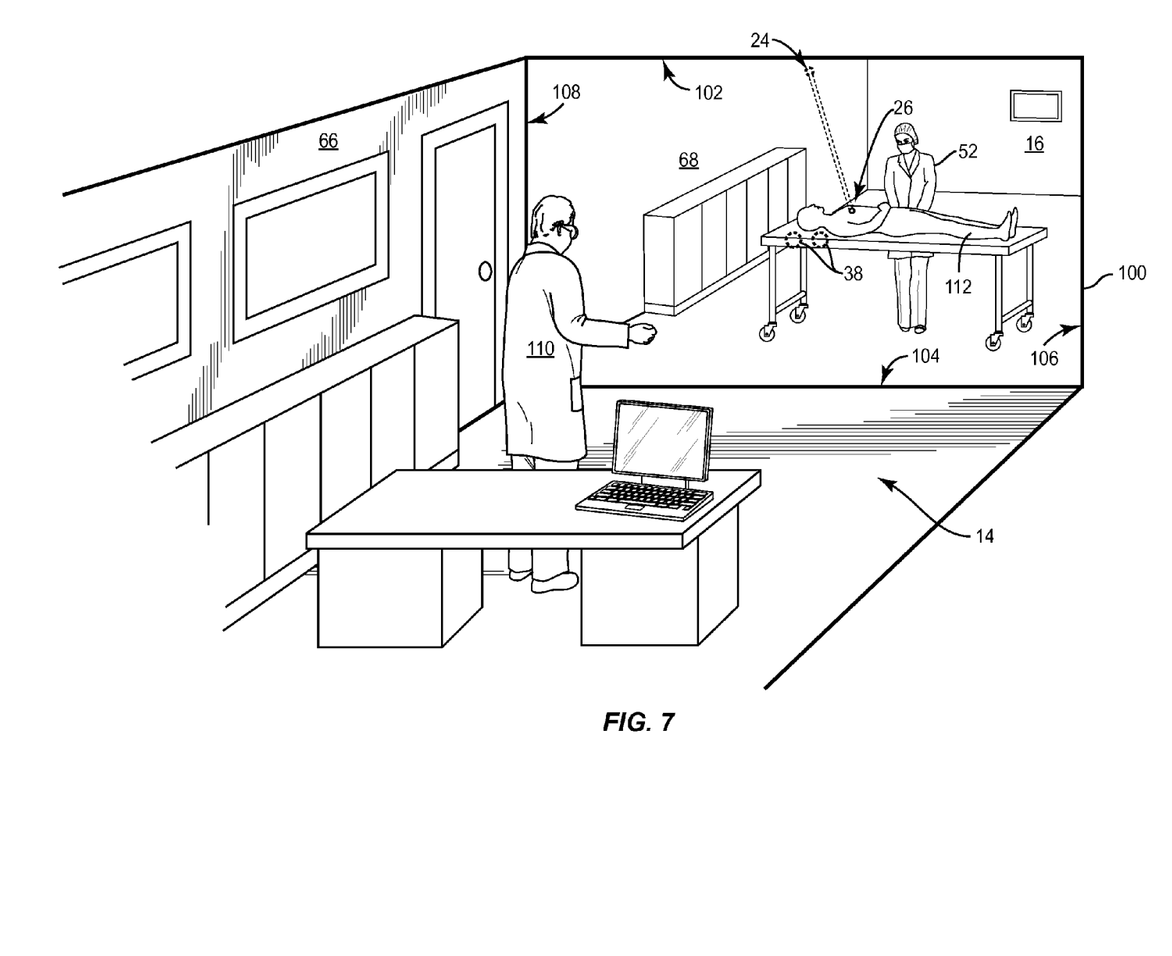
FIG. 7 is a perspective view of an exemplary laser control location according to one embodiment.

FIG. 7 is a perspective view of an exemplary laser control location 14 according to one embodiment. A display 100 forms a wall of the laser control location 14. A top edge 102 of the display 100 adjoins a ceiling (not shown) of the laser control location 14, a bottom edge 104 of the display 100 adjoins a floor of the laser control location 14, a right edge 106 of the display 100 adjoins a right side wall (not shown) of the laser control location 14, and a left edge 108 of the display 100 adjoins a left side wall 66 of the laser control location 14. Thus, the display 100 extends from the ceiling to the floor vertically, and from a first side wall to a second side wall horizontally. When presented on the display, the video data 20 generated by the conference system 50 100 depicts imagery of both the user 52 and portions of the laser activation location 16.

Assume in this embodiment that a user 110 (a doctor) wishes to collaborate with the user 52 (a nurse) regarding a patient 112. Assume that the laser control location 14 includes the conference system 38 and the laser activation location 16 includes the conference system 50. Some or all of the components of the conference system 38 may be located in a void behind the display 100. When imagery from the video data 20 is depicted on the display 100, it is preferable that the floor of the laser control location 14 appears to be contiguous with a floor of the laser activation location 16, the ceiling of the laser control location 14 appears to be contiguous with a ceiling of the laser activation location 16, the first side wall 66 of the laser control location 14 appears to be contiguous with a first side wall 68 of the laser activation location 16, and a second side wall (not shown) of the laser control location 14 appears to be contiguous with a second side wall (not shown) of the laser activation location 16. Thus, to the user 12, the laser activation location 16 appears as a continuation of the laser control location 14, and the imagery depicted on the display 100 is life size.

Assume that the specific topic of the collaboration regarding the patient 112 relates to a procedure that the user 52 will perform on a chest area of the patient 112. The laser 24 in this embodiment is mounted at or near the top of a front wall of the laser activation location 16. After the laser 24 is turned on, either by the user 52 or the user 110, the laser 24 emits a laser beam 26 which the user 110 orients to the desired location on the chest of the patient 112 to facilitate a conversation between the user 110 and the user 52.

In one embodiment, the camera 49 may comprise a 3D stereoscopic camera that is mounted behind a center of the display 100 as shown in dashed outline. The 3D stereoscopic camera captures imagery of the laser control location 14, including the user 110, via relatively small perforations in the display 100, and sends a 3D video stream to the laser activation location 16. Similarly, the camera 18 (not shown) may capture 3D stereoscopic imagery of the laser activation location 16, including the user 52, the patient 112, and the laser beam 26, and provide a stereoscopic video stream in the video data 20 to the first conference system 38. The display system 30 may comprise a 3D projector, and the user 110 may wear 3D glasses, such as shutter glasses or the like, in order to view the imagery depicted on the display 100 in 3D.

Figure 8:
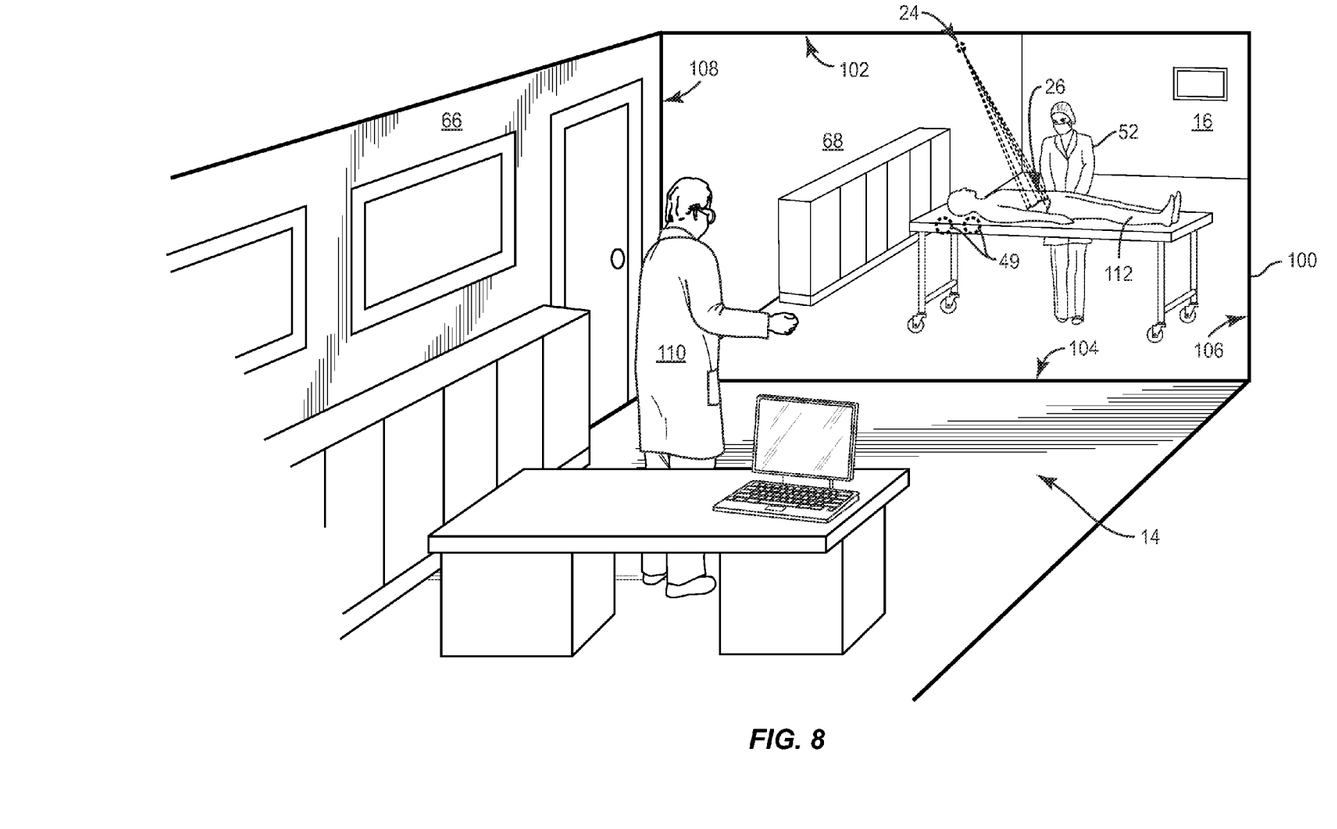
FIG. 8 is a perspective view of the exemplary laser control location illustrated in FIG. 7 according to another embodiment.

FIG. 8 is a perspective view of the exemplary laser control location 14 illustrated in FIG. 7 according to another embodiment. In this embodiment, the laser controller 22 (not shown) in the laser activation location 16 comprises a laser scanner that is configured to control the laser 24 in a scanning mode to generate a persistent laser beam image 114 along a relatively continuous laser beam path in accordance with the laser orientation data 36. The scanning mode of the laser controller 22 may be activated by the user 52, or by the user 110 via a predetermined laser control action that identifies a Scanning Mode On command to computing device 34. For example, assume that the user 110 has first oriented the laser beam 26 to a desired location on the chest of the patient 112. The user 110 next performs a predetermined laser control action that translates to a Scanning Mode On laser control command. The computing device 34 generates a Scanning Mode On laser control command, and communicates the laser control command to the conference system 50 (not shown). Upon receipt of the laser control command, the laser controller 22 goes into a scanning mode. The user 110 may subsequently perform one or more additional laser orientation actions 32 to indicate a desired path of the laser beam 26 on the chest of the patient 112. Laser orientation data 36 based on such laser orientation actions 32 is communicated to the laser controller 22, which in response controls the laser 24 to emit the persistent laser beam image 114 that identifies the relatively continuous laser beam path. Once the user 110 is satisfied with the persistent laser beam image 114, the user 110 may perform another laser control action which indicates that further input, or movement, from the user 110 should not be interpreted as a laser orientation action 32 that alters the direction of the laser beam 26, such that the laser beam 26 continues to display the persistent laser beam image 114 along the path while the users 110 and 52 communicate with one another.

Figure 9:
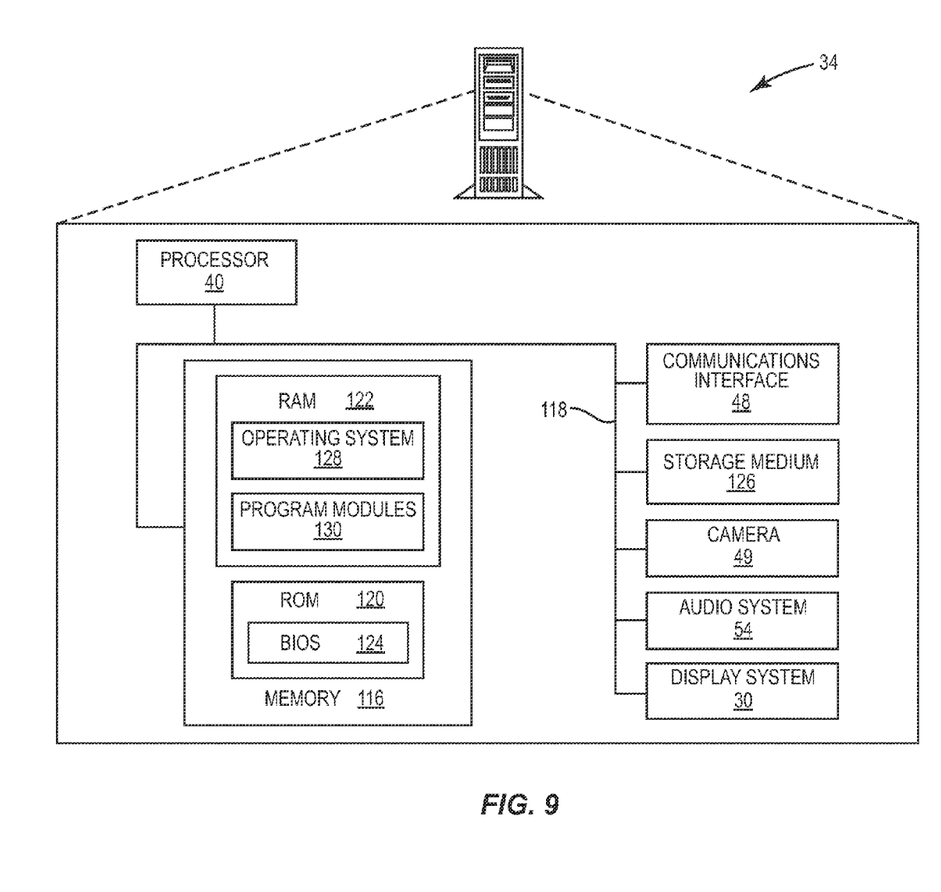
FIG. 9 illustrates additional components of the computing device according to one embodiment.

FIG. 9 illustrates additional components of the computing device 34 according to one embodiment. The computing device 34 may comprise, for example, a desktop computer, a workstation, a laptop computer, or the like. In addition to the features discussed previously herein, the exemplary computing device 34 comprises a system memory 116 and a system bus 118. The system bus 118 provides an interface for system components including, but not limited to, the system memory 116 and the processor 40. The processor 40 can be any of various commercially available or proprietary processors. Dual microprocessors and other multi-processor architectures may also be employed as the processor 40.

The system bus 118 may be any of several types of bus structures that may further interconnect to a memory bus (with or without a memory controller), a peripheral bus, and/or a local bus using any of a variety of commercially available bus architectures. The system memory 116 may include non-volatile memory 120 (e.g., read only memory (ROM), erasable programmable read only memory (EPROM), electrically erasable programmable read only memory (EEPROM), etc.) and/or volatile memory 122 (e.g., random access memory (RAM)). A basic input/output system (BIOS) 124 may be stored in the non-volatile memory 120, and can include the basic routines that help to transfer information between elements within the computing device 34. The volatile memory 122 may also include a high-speed RAM, such as static RAM, for caching data.

The computing device 34 may further include a storage medium 126, which may comprise, for example, an internal hard disk drive (HDD) (e.g., enhanced integrated drive electronics (EIDE) or serial advanced technology attachment (SATA)) for storage, flash memory, or the like. The storage medium 126 and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage medium 126 and in the volatile memory 122, including an operating system 128 and one or more program modules 130, which may implement the functionality described herein in whole or in part, including, for example, functionality associated with the orientation action determination function 42, motion detection function 44, orientation data generation function 46, or other processing and functionality described herein. It is to be appreciated that the embodiments can be implemented with various commercially available operating systems 128 or combinations of operating systems 128.

All or a portion of the embodiments may be implemented as a computer program product, such as a non-transitory computer-usable or computer-readable medium having a computer-readable program code embodied therein. The computer-readable program code can include software instructions for implementing the functionality of the embodiments described herein when executed on the processor 40. The processor 40, in conjunction with one or more of the program modules 130 in the volatile memory 122, may serve as a control system for the computing device 34 that is configured to, or adapted to, implement the functionality described herein.

The computing device 34 may also include the camera 49, all or portions of the audio system 54, and all or portions of the display system 30.

Those skilled in the art will recognize improvements and modifications to the preferred embodiments of the present disclosure. All such improvements and modifications are considered within the scope of the concepts disclosed herein and the claims that follow.

What is claimed is:

1. A method for controlling from a first location a laser at a second location, comprising:
    determining, by a computing device at the first location, laser orientation data;
    communicating the laser orientation data to the second location;
    receiving video data from the second location that includes imagery of a laser beam emitted by the laser; and
    presenting the imagery on a display at the first location.

2. The method of claim 1, wherein the laser orientation data is based on a laser orientation action, the laser orientation action identifying a desired change in a direction of the laser beam emitted by the laser.

3. The method of claim 2, wherein the laser orientation action comprises a movement of a digit of the user from a first location on a touch-sensitive surface to a second location on the touch sensitive surface.

4. The method of claim 2, wherein the laser orientation action comprises a movement of a hand of the user from a first location in space to a second location in space, and wherein determining the laser orientation data based on the laser orientation action of the user further comprises:
    detecting the movement of the hand of the user from the first location in space to the second location in space; and
    determining the laser orientation data based at least in part on the first location in space and the second location space.

5. The method of claim 4, wherein detecting the movement of the hand of the user from the first location in space to the second location in space further comprises determining a velocity of the hand of the user as the hand moves from the first location in space to the second location in space, and wherein the laser orientation data is further based on the velocity.

6. The method of claim 4, wherein detecting the movement of the hand of the user from the first location in space to the second location in space comprises:
    receiving first location data from an input device coupled to the hand, the first location data identifying the first location in space;
    receiving second location data from the input device, the second location data identifying the second location in space.

7. The method of claim 6, wherein the input device comprises a wireless input device worn on a digit of the user.

8. The method of claim 6, wherein the input device comprises a six-degree-of-freedom gyroscope.

9. The method of claim 4, wherein the computing device comprises a motion detection function, and wherein detecting the movement of the hand of the user from the first location in space to the second location in space is performed by the motion detection function.

10. The method of claim 1, wherein the first location comprises a room having four walls, and wherein one of the four walls comprises the display, the display extending from a ceiling of the room to a floor of the room vertically, and from a first side wall to a second side wall horizontally.

11. The method of claim 10, wherein the video data comprises imagery depicting the second location, wherein the video data is presented on the display such that objects depicted in the imagery are depicted on the display at life size.

12. The method of claim 1, wherein the laser orientation data identifies a plurality of desired changes in the direction of the laser beam emitted by the laser, wherein the plurality of desired changes defines a relatively continuous laser beam path.

13. The method of claim 12, wherein the second location comprises a laser scanner, the laser scanner adapted to receive the laser orientation data and control the laser in a scanning mode to generate a persistent laser beam image along the relatively continuous laser beam path.

14. The method of claim 13, wherein the video data includes imagery of the persistent laser beam image.

15. A laser control apparatus for controlling a laser in a remote location, comprising:
    a communication interface adapted to communicate with a network;
    a processor coupled to the communication interface, the processor configured to:
        determine laser orientation data;
        communicate the laser orientation data to the remote location;
        receive video data from remote location that includes imagery of a laser beam emitted by a laser; and
        effect presentation of the imagery on a display.

16. The laser control apparatus of claim 15, wherein the laser orientation data is based on a laser orientation action of a user, the laser orientation action identifying a desired change in a direction of the laser beam emitted by the laser.

17. The laser control apparatus of claim 16, wherein the laser orientation action comprises a movement of a hand of the user from a first location in space to a second location in space, and wherein to determine the laser orientation data based on the laser orientation action of the user, the processor is further configured to:
    detect the movement of the hand of the user from the first location in space to the second location in space; and
    determine the laser orientation data based at least in part on the first location in space and the second location in space.

18. The laser control apparatus of claim 15, wherein the laser orientation data identifies a plurality of desired changes in the direction of the laser beam emitted by the laser, wherein the plurality of desired changes defines a relatively continuous laser beam path.

19. A laser control system for controlling from a first location a laser at a second location, comprising:

a first conference system and a second conference system, the first conference system comprising:
- a first communication interface adapted to communicate with a network;
- a first processor coupled to the first communication interface, the first processor configured to:
  - determine laser orientation data at the first location;
  - communicate the laser orientation data to the second conference system at the second location is the network;
  - receive video data from the second conference system that includes imagery of a laser beam emitted by the laser at the second location; and
  - effect presentation of the imagery on a display at the first location; and the second conference system comprising:
- a second communication interface adapted to communicate with the network;
- a second processor coupled to the second communication interface, the second processor configured to:
  - receive the laser orientation data;
  - control the laser that emits the laser beam based on the laser orientation data; and
  - communicate the video data that includes the imagery of the laser beam to the first conference system via the network.

20. The laser control system of claim 19, wherein the second conference system further comprises a laser scanner adapted to control the laser based on the laser orientation data.

* * * * *